United States Patent [19]

Fiedler, Jr.

[11] 4,286,768
[45] Sep. 1, 1981

[54] STEPPED PRESSURE GAS VALVE APPARATUS

[75] Inventor: Frank Fiedler, Jr., Rowland Heights, Calif.

[73] Assignee: Walter Kidde and Company, Inc., Clifton, N.J.

[21] Appl. No.: 108,165

[22] Filed: Dec. 28, 1979

[51] Int. Cl.³ .............................................. F16K 31/02
[52] U.S. Cl. ..................................... 251/130; 251/73; 137/461
[58] Field of Search ........................... 251/130, 73, 94; 137/461, 463

[56] References Cited

U.S. PATENT DOCUMENTS

| | | | |
|---|---|---|---|
| 4,141,383 | 2/1979 | Geimer | 251/130 X |
| 4,179,097 | 12/1979 | Fiedler | 251/130 |
| 4,180,241 | 12/1979 | Fiedler | 251/130 |

Primary Examiner—Harold W. Weakley
Attorney, Agent, or Firm—John E. Toupal

[57] ABSTRACT

The invention is a pressure responsive shut-off valve including a valve housing that defines a fluid inlet and a fluid outlet separated by a valve seat. A valve closure accommodated by the valve seat moves between open and closed positions to control fluid flow between the inlet and outlet. Controlling the valve is a valve operator including a pressure responsive piston that moves between a set position in which the valve closure is separated from the valve seat and a release position in which the closure is seated on the seat to prevent fluid flow between the inlet and outlet. Retaining the piston is a magnetic plunger that defines an activating volume communicating with the inlet and establishing on one face of the piston a fluid pressure forcing the piston toward its release position, and a reference volume communicating with the inlet and establishing on the opposite face of the piston a reference volume. A bias spring member is disposed in the activating volume and has one end coupled to the piston and an opposite end coupled to the housing. The spring member urges the valve operator in a direction to produce closure of the valve. An internal seal isolates the inlet from the reference volume with the piston in its set position while allowing fluid communication therebetween with the piston in its release position. Maintaining the piston in the set position is a latching mechanism that, after activation to its release position can be manually reset.

7 Claims, 2 Drawing Figures

STEPPED PRESSURE GAS VALVE APPARATUS

BACKGROUND OF THE INVENTION

This invention relates generally to a pressure responsive fluid shut-off device and, more particularly, to a device for shutting off a supply of liquid propane (LP) gas in the event that a malfunction in a supply system results in excessive gas pressures.

The appearance of excessive gas pressures in LP gas supply systems introduces substantial risk of fire and explosion. In most domestic LP gas systems, fire and explosion hazards are prevented by a regulator located between an LP gas supply tank and a supply line feeding appliances encompassed by the system. The regulator functions to reduce supply tank pressure, typically above 100 psi, to a safe line pressure of less than 1 psi. However, malfunctions in such regulators often lead to the appearance of hazardous gas pressures in supply lines. A common cause of regulator malfunction is a blockage of vent openings that establish atmospheric reference pressures in typical differential pressure responsive regulators. Upon loss of an accurate atmospheric pressure reference, a regulator can cease to function properly and in some instances, allow a hazardous increase in gas pressure. Also, under certain circumstances, low pressure liquid propane will leak through a regulator valve and then evaporate in the supply line creating hazardous gas pressure therein.

Many of the above problems are eliminated by a combined solenoid operated valve and shut-off device disclosed in U.S. Pat. No. 4,180,241 issued Dec. 25, 1979. That valve includes a magnetic plunger for cycling a valve closure between open and closed positions in response to an electrical signal and a shut-off mechanism activatable to lock the valve closure in its closed position in response to a predetermined fluid pressure at the inlet. Valve operation is provided by an actuator rod that is normally latched in a set position within the magnetic plunger and reciprocates therewith to produce the desired cycling of the valve closure. However, in response to an excessive inlet pressure, a piston moves the actuator rod relative to the plunger into a release position which locks the closure means in closed position and prevents any further gas flow. A resumption of gas flow requires actuation of the reset mechanism to move the plunger relative to the actuator rod so as to produce latching thereof into its set position and thereby permit reopening of the valve.

Although eliminating most of the problems associated with prior LP gas valves, the above mentioned valve and shut-off device exhibits one undesirable trait. A bias spring member produces a continuous force that tends to separate the magnetic plunger and actuator rod. This factor can sometimes cause inadvertent shut-off of the valve.

The object of this invention, therefore, is to provide an improved pressure responsive shut-off that eliminates the dangers associated with excessively high gas pressure in the supply lines of LP gas systems.

SUMMARY OF THE INVENTION

The invention is a pressure responsive shut-off valve including a valve housing that defines a fluid inlet and a fluid outlet separated by a valve seat. A valve closure accommodated by the valve seat moves between open and closed positions to control fluid flow between the inlet and outlet. Controlling the valve is a valve operator including a pressure responsive piston that moves between a set position in which the valve closure is separated from the valve seat and a release position in which the closure is seated on the seat to prevent fluid flow between the inlet and outlet. Retaining the piston is a cylinder body that defines an activating volume communicating with the inlet and establishing on one face of the piston a fluid pressure forcing the piston toward its release position, and a reference volume communicating with the inlet and establishing on the opposite face of the piston, a reference volume. A bias spring member is disposed in the activating volume and has one end coupled to the piston and an opposite end coupled to the housing. The spring member urges the valve operator in a direction to produce closure of the valve. An internal seal isolates the inlet from the reference volume with the piston in its set position while allowing fluid communication therebetween with the piston in its release position. Maintaining the piston in the set position is a latching mechanism that, after activation of the piston to its release position by excessive pressure, can be restored by a manual reset. The use of a spring member extending between the piston and the housing provides a desired operating bias for the plunger but fails to produce an undesirable continuous force tending to activate the shut-off mechanism. In addition, this arrangement reduces the components required for the valve and thereby reduces its cost.

In a preferred embodiment of the invention, the valve operator comprises a reciprocal actuator rod extending between the valve closure and the piston. The actuator rod includes a first longitudinal portion of one diameter and a second longitudinal portion of smaller diameter disposed between the piston and the first longitudinal portion. The reference volume seal comprises an O-ring retained by the cylinder at one end of the reference chamber and disposed so as to encompass the first rod portion with a piston in its set position and to encompass the second rod portion with the piston in its release position. Movement of the first rod portion into the O-ring establishes a fluid tight seal for the reference chamber, while movement of the second rod portion into the O-ring allows fluid communication between the reference chamber and the inlet. The actuator rod with portions of different diameter provides the automatic venting of the reference chamber required both to establish a significant valve closure stroke and to permit reset of the piston into its set position.

Another feature of the invention is the provision of a latching mechanism composed of an annular rib located between the first and second rod portions and extending radially from the one diameter. During reset of the valve to an open position, the annular rib is forced through the O-ring and becomes engaged therewith so as to inhibit movement of the piston into its release position. This reset of the valve is accomplished by activation of a reset button that projects out of the housing so as to be manually accessible. Activation of the reset button produces longitudinal movement of the cylinder body and forces the O-ring over the annular latching rib to thereby latch the piston in its set position.

DESCRIPTION OF THE DRAWINGS

These and other objects and features of the present invention will become more apparent upon perusal of the following description taken in conjunction with the accompanying drawings wherein.

DESCRIPTION OF THE PREFERRED EMBODIMENT

Figure 1:
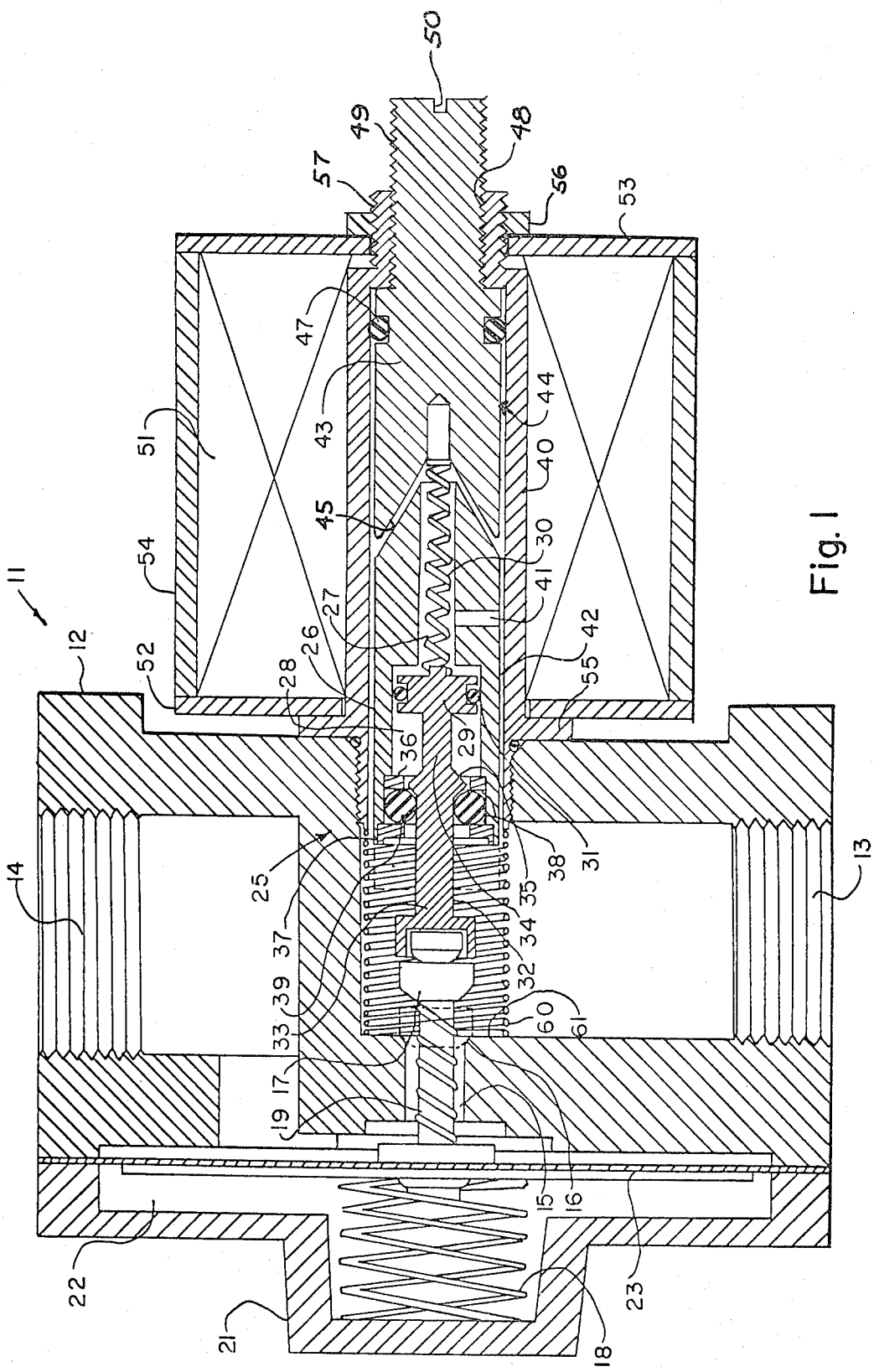
FIG. 1 is a schematic cross-sectional view of a shut-off valve according to the present invention and shown in an open position.

Referring to the Figures, there is shown a valve assembly 11 including a housing 12 that defines a gas inlet 13 and a gas outlet 14 separated by a passage 15 that forms a valve seat 16. Located within the housing 12 is a valve closure 17 that reciprocates between an open position (FIG. 1) away from the valve seat 16 wherein gas flow is permitted between the inlet 13 and the outlet 14 and a closed position (FIG. 2) against the valve seat 16 wherein fluid flow is prevented. A connecting rod 19 is coupled between the closure 17 and a coil spring 18 that biases the valve toward its open position. Enclosing the spring 18 is a cover 21 that forms a vented chamber 22 sealed from the valve inlet 14 by a flexible diaphragm 23.

Also located within the valve housing 12 is an operator mechanism 25 that controls operation of the valve 11. The operator 25 includes a cylinder body 26 that defines both an activating volume 27 and a reference volume 28 separated by a reciprocable piston 29. Connected to the piston 29 is one end of a compressed spring 30. The activating volume 27 is sealed from the reference volume 28 by an O-ring 31 retained by a groove in the periphery of the piston 29. Extending between the piston 29 and the closure 17 is an actuator rod 32 that is also a part of the operator mechanism 25. The actuator rod 32 includes a first longitudinal rod portion 33 of one diameter and a second longitudinal rod portion 34 of a smaller diameter. Located between the rod portions 33 and 34 is an annular rib 35 that projects radially beyond the outer surface of the first rod portion 33. At the end of the reference volume 28 opposite to the piston 29 is an annular groove 38 formed by a pair of washers 36 and 37 retained by internal shoulders on the cylinder body 26. An O-ring seal 39 is received by the groove 38 and possesses an internal diameter that seals against the first actuator rod portion 33 with the operator 25 in the position shown in FIG. 1. However, with the operator 25 in the position shown in FIG. 2, the O-ring seal 39 allows fluid flow around the second rod portion 34 between the inlet 13 and the reference volume 28. Enclosing the cylinder body 26 is a cylindrical housing 40 that extends from and is secured by threads to the main housing 12. Providing fluid communication between the inlet 13 and the activatating volume 27 are a passage 41 through the cylinder body 26 and an annular clearance 42 between the cylinder body 26 and the cylindrical housing 40.

Also retained by the cylindrical housing 40 is a manual shut-off mechanism 44 including primarily an elongated stem 43. A concave surface 45 at an inner end of the stem 43 serves as a mechanical stop for a tapered end of the body 26 and is engaged by an opposite end of the spring 30. An O-ring 47 retained by a circumferential groove in the stem 43 seals the interior of the valve housing 12 from the atmosphere. Engaging a threaded inner surface 48 at the outer end of the cylindrical housing 40 is an externally threaded activator portion 49 on the stem 43. The activator portion extends out of the housing 40 and possesses a slot 50 for receiving a suitable screwdriver (not shown).

An annular solenoid winding 51 is positioned over the cylindrical housing 40 and can be energized to activate the cylinder body 26 that functions as a solenoid plunger. Longitudinally retaining the solenoid winding 51 on the cylindrical housing 40 is a pair of washers 52 and 53 that straddle a winding enclosing cylinder 54. The inner washer 52 engages a flange 55 on the cylindrical housing 40 and is abutted by one end of the enclosing cylinder 54. The opposite end of the cylinder 54 receives and is secured to the outer washer 53 by a nut 56 that engages a threaded outer surface 57 on the outer end of the cylindrical housing 40.

Also mounted within the housing 12 is a spiral spring 60 that removes particulate impurities being transmitted with the gas flowing between the inlet 13 and the outlet 14. The spiral spring 60 is compressed between an annular planar surface 61 encircling the orifice 16 and a planar surface 62 defined by a peripheral edge of the cylindrical housing 40. The spiral spring 60 surrounds and is actually aligned with the actuator rod 32 and the plunger body 26 so as to accommodate longitudinal movement thereof.

In typical use of the valve 11, the outlet 14 is connected directly to a gas appliance such as a stove, hot water heater, refrigerator, etc., and the inlet 13 is connected to a source of LP gas. The solenoid winding 51 is electrically connected for energization by a temperature controller (not shown) associated with the appliance being served. In the absence of a call for fuel, the solenoid 51 is de-energized and the compressed spring 30 forces the plunger 26 into the position shown by dotted lines in FIG. 1 to thereby close the orifice 15 and prevent gas flow between the inlet 13 and the outlet 14. In response to a call for gas, however, the solenoid winding 51 is energized to move the plunger 26 into the position shown by solid lines in FIG. 1. This allows the spring member 18 to force the closure 17 into its open position and initiate gas flow between the inlet 13 and the outlet 14.

Figure 2:
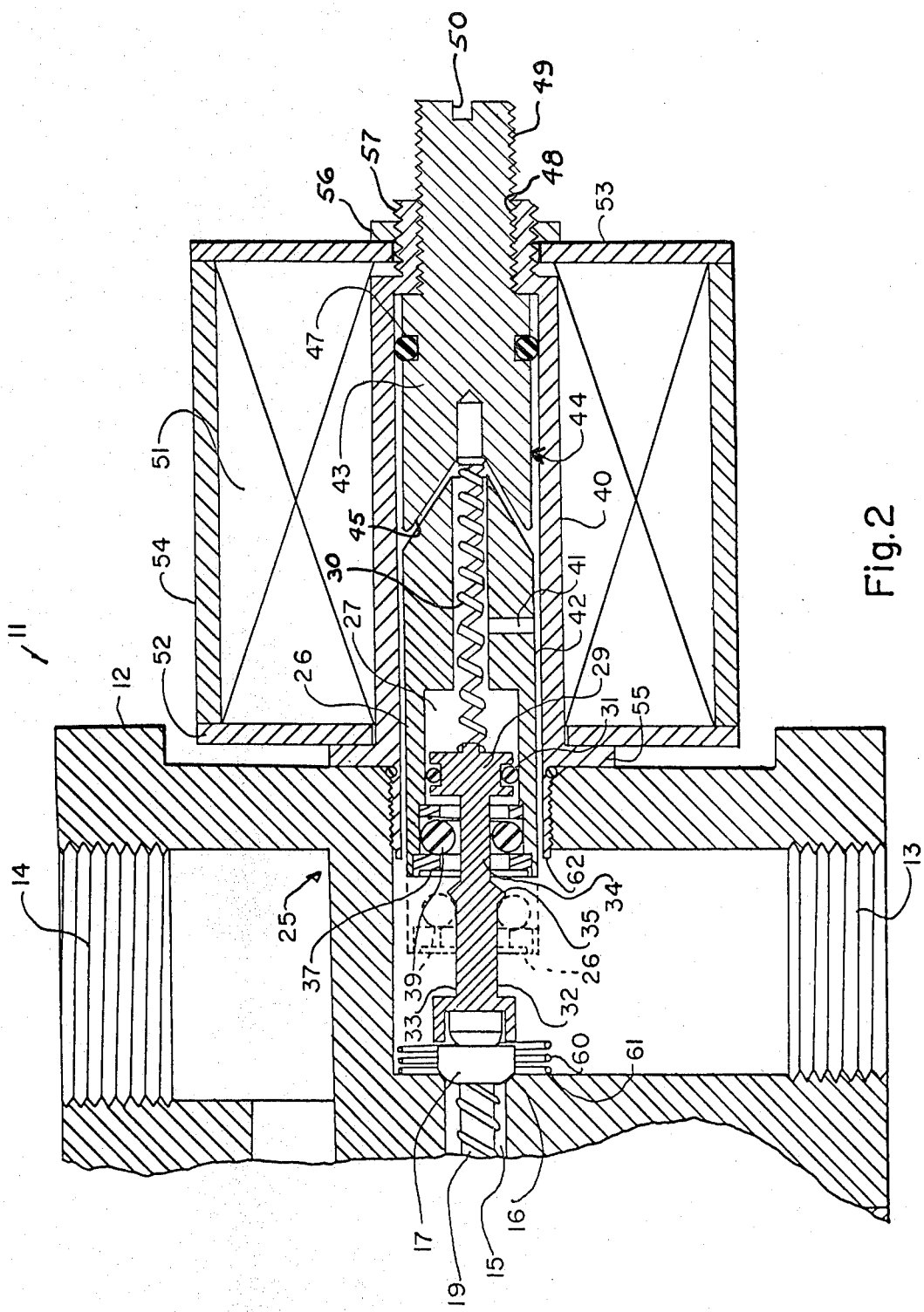
FIG. 2 is a partial schematic cross-sectional view showing the shut-off valve of FIG. 1 in a closed position.

During such normal operation of the valve 11, the automatic operator mechanism 25 is inactive and the parts thereof remain in the relative positions shown in FIG. 1. With the operator 25 in that set position, there exists a resultant force tending to move the actuator rod 32 into the release position shown in FIG. 2 and thereby eliminate gas flow between the inlet 13 and the outlet 14. This resultant force includes the gas pressure at the inlet 13 times the area of the piston 29 minus the cross-sectional area of the first rod portion 33 plus the force exerted by the spring member 30 assuming that the plunger 26 is retained by the energized winding 51. It will be noted that the force provided by the pressure in the activating volume 27 against the full face of the piston 29 is opposed only by inlet gas pressure times the cross-sectional area of the first rod portion 33 because the reference volume 28 is sealed from the inlet 13 by the O-ring seal 39 with the piston 29 in the set position of FIG. 1. The resultant force tending to move the piston 29 into its release position of FIG. 2 is restrained during normal operating conditions by the latching effect created by engagement between the annular rib 35 and the O-ring 39.

In the event that gas flow is to be completely eliminated, the manual shut-off 44 is actuated to establish a positively closed position for the valve closure 17. Appropriate manually induced rotation of the stem 43 moves the stop portion 45 into engagement with the plunger 26 which is forced into the position shown by dotted lines in FIG. 2. This produces and maintains a positive closure of the valve. Energization of the solenoid winding 51 will not attract the plunger 26 which is positively prevented from movement by the stop portion 45 of the manual shut-off 44. A renewal of gas flow under the control of the winding 51 requires manual actuation of the shut-off 44 to rotate the stem 43 to the open position shown in FIGS. 1 and 2. It will be noted that during the above described manual closure of the valve, an override protection is provided by the spacing between the piston 29 and the plunger 26. This protection prevents damage to the valve seat 16 in the event further inward movement of the stem 43 is induced after initial closure of the valve.

During normal operation of the valve, an increase in gas pressure at the inlet 13 causes the resultant force on the actuator rod 32 also to increase because of the differential pressure characteristic described above. At some predetermined inlet pressure, the closing force on the rod 32 is sufficient to overcome the effect of the latch 35 and the actuator rod 32 automatically moves the valve closure 17 against the seat 16 as shown in FIG. 2 and thereby prevents gas flow between the inlet 13 and the outlet 14. It will be noted that once the latching rib 35 has been forced through the O-ring seal 39, the reduced diameter of the second rod portion 34 provides a fluid communication path between the inlet 13 and the reference volume 28. Consequently, the decreasing volume of the reference chamber 28 does not experience a pressure build-up that would prevent closure of the valve.

Once the operator 25 has functioned to automatically close the valve orifice 15, reopening of the valve can be accomplished only by a manual reset of the device. To accomplish reset, the stem 43 is rotated inwardly forcing the cylinder plunger 26 into the cylinder housing 40 as shown by dotted lines in FIG. 2. During this movement the actuator rod 32 is abutted against the seated closure 17 and remains stationery. In this manner, the O-ring seal 39 is forced over the latching rib 35 to again become latched therewith and re-establish the set positions shown in FIG. 1. It will be noted again that during this reset movement by the plunger cylinder 26, a pressure build-up does not occur in the reference chamber 28 because of the communication path provided around the reduced diameter second portion 34. After latching has been re-established, the stem 43 is withdrawn to the operating position shown in FIGS. 1 and 2. Thereafter, the spring member 18 can move the closure 17 off of the seat 16 to open the valve 11 in response to energization of the solenoid winding 51.

Obviously, many modifications and variations of the present invention are possible in light of the above teachings. For example only, the threadedly engaged stem 43 can be replaced by other types of positive displacement mechanisms such as ratchets, levers, toggles, or latchable push buttons. It is therefore to be understood that within the scope of the appended claims, the invention can be practised otherwise than as specifically described.

What is claimed is:

1. A pressure responsive shut-off valve comprising:
a valve housing means defining a fluid inlet and a fluid outlet and a valve seat therebetween;
a valve closure means movable between a closed position against said valve seat and an open position away therefrom, said closure means preventing fluid flow between said inlet and outlet when in said closed position and permitting said fluid flow when in said open position;
a valve operator means comprising a pressure responsive piston movable between set and release positions, said operator means coupled to said valve closure means so as to effect location thereof in said open position with said piston in said set position and location thereof in said closed position with said piston in said release position;
a cylindrical magnetic plunger mounted for reciprocable movement in said housing means and retaining said piston, said plunger defining an activating volume communicating with said inlet and establishing an activating fluid pressure on one face of said piston, said activating fluid pressure forcing said piston toward said release position, said plunger further defining a reference volume communicating with said inlet and establishing a reference volume on the opposite face of said piston;
a bias spring member disposed in said activating volume and having one end coupled to said piston and an opposite end directly connected to said housing means, said spring member urging said valve operator means in a direction to produce movement of said valve closure means to said closed position;
a seal means for sealing said inlet from said reference volume with said piston in said set position and providing fluid communication therebetween with said piston in said release position;
latching means for latching said piston in said set position; and
manual reset means for moving said piston from said release position to said set position.

2. A valve according to claim 1 wherein said operator means comprises a reciprocable actuator rod extending between said closure means and said piston.

3. A valve according to claim 2 wherein said actuator rod comprises a first longitudinal portion of one diameter and a second longitudinal portion disposed between said piston and said first longitudinal portion and having a smaller diameter than said one diameter, said seal means comprises an O-ring retained by said cylinder at one end of said reference chamber, said O-ring disposed so as to encircle said first rod portion with said piston in said set position and to encircle said second rod portion with said piston in said release position, and said O-ring possesses an internal diameter such as to establish a fluid tight seal with said first rod portion and to provide fluid communication around said second rod portion.

4. A valve according to claim 3 wherein said latching means comprises a latching portion of said rod disposed between said first and second portions and projecting radially beyond said one diameter, said latching portion lying within said reference chamber and engaging said O-ring with said piston in said set position so as to inhibit movement thereof into said release position.

5. A valve according to claim 4 wherein said latching portion comprises an annular rib projecting from said rod between said first and second portions.

6. A valve according to claim 4 wherein said reset means comprises a reset actuator means engageable with said plunger and projecting out of said housing means, said actuator means being manually operable to produce longitudinal movement of said plunger so as to force said latching portion by said O-ring into said reference chamber.

7. A valve according to claim 6 wherein said reset actuator means comprises a stem threadedly engaged with said housing means.

* * * * *